United States Patent [19]
Kudoh et al.

[11] Patent Number: 6,034,641
[45] Date of Patent: *Mar. 7, 2000

[54] ANTENNA DEVICE

[75] Inventors: Hiroshi Kudoh; Jun Ashihara, both of Wako, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/931,217

[22] Filed: Sep. 16, 1997

[30] Foreign Application Priority Data

Sep. 18, 1996 [JP] Japan ................................ 8-246546

[51] Int. Cl.⁷ .................................................. G01S 7/28
[52] U.S. Cl. .................... 343/753; 343/700 MS; 343/834; 342/70; 342/175
[58] Field of Search .................... 343/753, 834, 343/840, 700 MS; 342/70, 71, 72, 175

[56] References Cited

U.S. PATENT DOCUMENTS 5,717,399  2/1998  Urabe et al. .............................. 342/70
5,724,042  3/1998  Komatsu et al. ......................... 342/70

FOREIGN PATENT DOCUMENTS 06254470  9/1994  Japan .

*Primary Examiner*—Don Wong
*Assistant Examiner*—James Clinger
*Attorney, Agent, or Firm*—Lyon & Lyon LLP

[57] ABSTRACT

An antenna device comprises an array antenna having a plurality of transmitting planar antenna elements and a plurality of receiving planar antenna elements, a transmission selecting circuit for selecting at least one of the transmitting planar antenna elements, a transmitting circuit for transmitting a signal to the selected at least one transmitting planar antenna element, a reception selecting circuit for selecting at least one of the receiving planar antenna elements, and a receiving circuit for receiving a signal from the selected at least one receiving antenna element. By selecting the planar antenna elements exclusively for transmission or reception, it becomes possible to radiate or absorb (receive) a main beam in or from a direction corresponding to the respective planar antenna element, thereby enabling more minute switching of the main beam directions and improving the directional resolution of the antenna device. Further, by providing the transmitting and receiving planar antenna elements separately, it becomes possible to prevent the deterioration of the reception sensitivity due to the leakage of part of a received signal into a transmission system of the antenna device. An antenna system employing the antenna device is also disclosed.

27 Claims, 4 Drawing Sheets

ANTENNA DEVICE

BACKGROUND OF THE INVENTION

1. Field of the Invention

The present invention relates to an antenna device having a plurality of arrayed planar antenna elements which can be operated selectively, and to an antenna system employing the antenna device.

2. Description of the Related Art

Japanese Patent Laid-Open Publication No. HEI 8-97620 discloses a multibeam planar array antenna which comprises a plurality of patches arrayed on a dielectric substrate, a feeding section and feeders connecting between the feeding section and the individual patches. The patches form antenna elements for radiating beams of different tilt angles set on the basis of the differences between the lengths of their respective feeders. The feeders includes a feed selecting circuit for selectively starting or stopping feeding to the respective antenna elements.

The disclosed multibeam planar array antenna is capable of producing multibeams corresponding to the respective antenna elements by selectively operating the antenna elements. However, it is strongly demanded that there be provided a reduced size antenna device which allows more minute switching of the directions of multibeams.

Each antenna element of the array antenna is used for both transmission and reception. In the antenna, when separation of transmitted and received signals by a circulator is effected insufficiently, part of the received signals may leak into an associated transmission system, thereby deteriorating the reception sensitivity of the antenna. Consequently, it is demanded that there be provided an antenna device which minimizes or prevents such reception sensitivity deterioration.

SUMMARY OF THE INVENTION

It is therefore an object of the present invention to provide a reduced size antenna device which allows more minute switching of the directions of main beams and has high reception sensitivity.

Another object of the present invention is to provide an antenna system employing the antenna device.

According to a first aspect of the present invention, there is provided an antenna device comprising an array antenna having a plurality of transmitting planar antenna elements and a plurality of receiving planar antenna elements, a transmission selecting circuit for selecting at least one of the transmitting planar antenna elements, a transmitting circuit for transmitting a signal to the selected at least one transmitting antenna element, and a receiving circuit for receiving a signal from each of the receiving planar antenna elements.

In a preferred form of the embodiment, the transmission selecting circuit selects two of the transmitting planar antenna elements, and the transmitting circuit transmits the signal to the selected at least two transmitting planar antenna elements simultaneously.

By selecting one transmitting planar antenna element exclusively for transmission, it becomes possible to radiate a main beam in a direction corresponding to the respective transmitting planar antenna element. When two or more transmitting planar antenna elements are selected for simultaneous transmission, two or more main beams can be synthesized or combined and transmitted in a direction different from that of the case wherein one transmitting planar antenna element is selected for feeding. This enables more minute switching of the main beam directions and improves the directional resolution of the antenna device. Provision of the transmitting and receiving planar antenna elements separately also enables separation of a transmission system and a reception system of the antenna device to thereby significantly lower the level of deterioration of the reception sensitivity of the antenna device due to the leakage of part of a received signal into the transmission system, in contrast to the conventional case where only one planar antenna element is selected for both transmission and reception.

According to a second aspect of the present invention, there is provided an antenna device comprising an array antenna having a plurality of transmitting planar antenna elements and a plurality of receiving planar antenna elements, a transmitting circuit for transmitting a signal to each of the transmitting planar antenna elements, a reception selecting circuit for selecting at least one of the receiving planar antenna elements, and a receiving circuit for receiving a signal from the selected at least one receiving planar antenna element.

In a preferred form of the embodiment, the reception selecting circuit selects two of the receiving planar antenna elements, and the receiving circuit receives the signals from the selected two receiving antenna elements simultaneously.

By selecting one receiving planar antenna element for reception, it becomes possible to absorb (receive) a beam from a direction corresponding to the respective receiving planar antenna element. When two or more receiving planar antenna elements are selected for reception, two or more main beams can be synthesized or combined and absorbed (received) from a direction different from that of the case where one receiving planar antenna element is selected for reception. As a result, more minute switching of the directions of beam reception, thereby improving the directional resolution of the antenna device. Diversity reception of reflected beams from a target (object) is also enabled, thereby making it possible to detect a detailed configuration of the target.

According to a third aspect of the present invention, an antenna device comprising an array antenna having a plurality of transmitting planar antenna elements and a plurality of receiving planar antenna elements, a transmission selecting circuit for selecting at least one of the transmitting planar antenna elements, a transmitting circuit for transmitting a signal to the selected at least one transmitting planar antenna element, a reception selecting circuit for selecting at least one of the receiving antenna elements, and a receiving circuit for receiving a signal from the selected at least one receiving antenna element.

In one preferred form of the embodiment, the transmission selecting circuit selects two of the transmitting planar antenna elements. The transmitting circuit transmits the signal to the selected two transmitting antenna elements simultaneously. The reception selecting circuit selects two of the receiving planar antenna elements. The receiving circuit receives the signals from the selected two receiving planar antenna elements simultaneously. The antenna device thus arranged has all of the advantages of the antenna devices according to the above-mentioned first and second aspects.

Desirably, the array antenna and the transmission selecting circuit of the antenna device are formed on the same substrate. In another desired form, the array antenna, the transmission selecting circuit and the reception selecting circuit are formed on the same substrate.

By providing the array antenna and the transmission selecting circuit and/or the reception selecting circuit on the same substrate and making the former unified with the latter, it becomes possible to increase the durability and reliability of the array antenna and transmission selecting circuit and to provide the antenna device reduced in size. Even when the substrate is subjected to vibrations, the positional relationship between the transmitting and receiving planar antenna elements remains unchanged, thereby increasing the reliability of the antenna device.

In one preferred form, the antenna device is combined with a lens or a reflector to thereby provide an aperture antenna system. In this instance, the antenna device forms a primary radiator of the aperture antenna system while the lens or reflector forms a secondary radiator of the antenna system. Use of the inventive antenna device enables downsizing of the primary radiator while use of the lens or reflector as the secondary radiator enables the switching of the beam directions by defocused feeding, etc.

The above and other objects, features and advantages of the present invention will become manifest to those versed in the art upon making reference to the detailed description and the accompanying sheets of drawings in which certain preferred structural embodiments incorporating the principles of the invention are shown by way of illustrative examples.

DETAILED DESCRIPTION OF THE PREFERRED EMBODIMENTS

The following description is merely exemplary in nature and is in no way intended to limit the invention or its application or uses.

Figure 1:
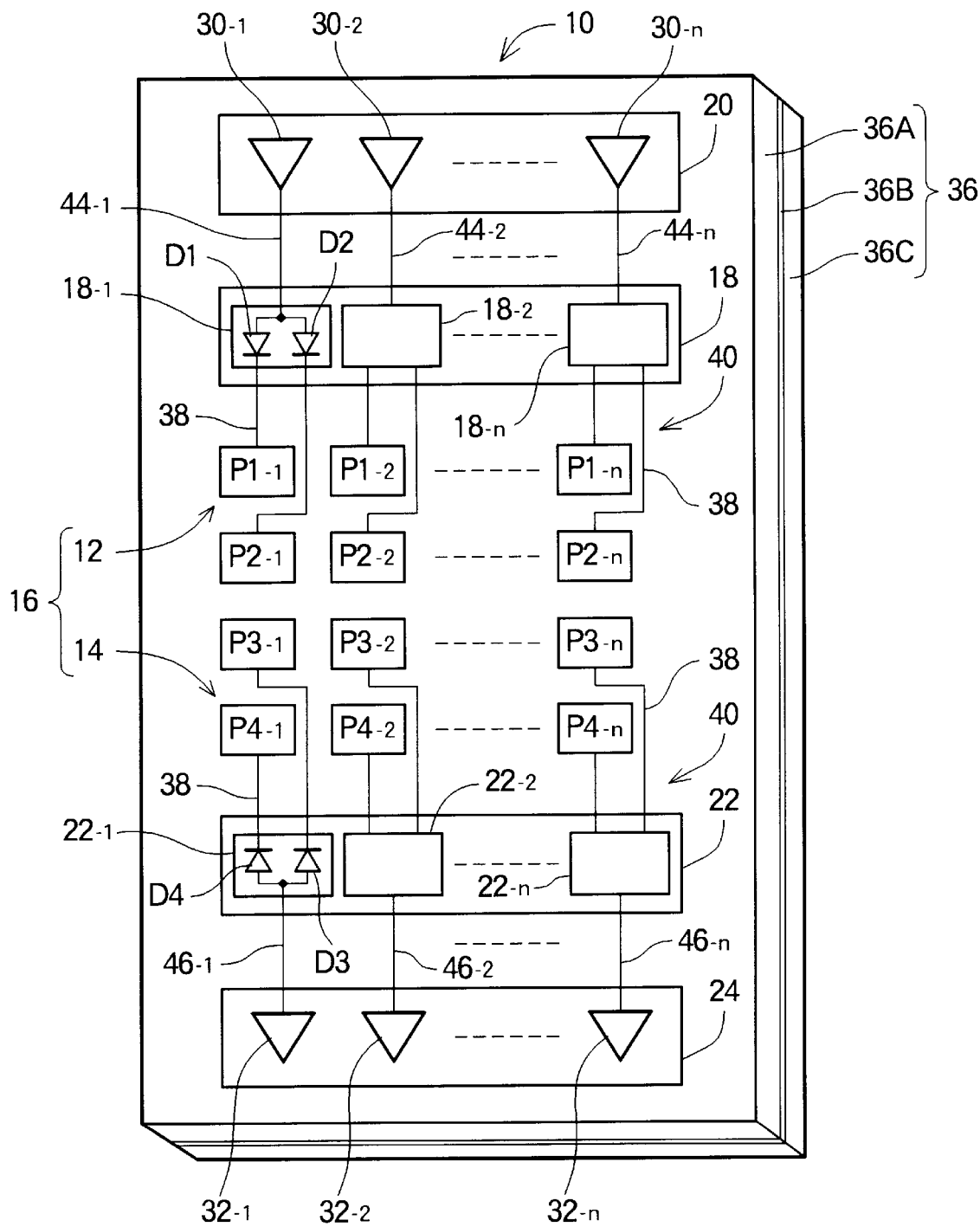
FIG. 1 is a schematic perspective view illustrating an antenna device according to the present invention.

Referring to FIG. 1, there is shown an antenna device 10 according to the present invention. The antenna device 10 comprises an array antenna 16 having a plurality of transmitting planar antenna elements 12 and a plurality of receiving planar antenna elements 14 arranged in a matrix, a transmission selecting circuit 18 for selecting at least one of the transmitting planar antenna elements 12 of the array antenna 16, a transmitting circuit 20 for transmitting a signal to the selected at least one transmitting planar antenna element 12, a reception selecting circuit 22 for selecting at least one of the receiving planar antenna elements 14 of the array antenna 16, and a receiving circuit 24 for receiving a signal from the selected at least one receiving planar antenna element 14.

Transmitting circuit 20 has FM signal generators 26 (FIG. 2), couplers 28 (FIG. 2) and high-frequency amplifiers 30, all being as many as "n". The receiving circuit 24 is provided with high-frequency amplifiers 32 and mixers 34 (FIG. 2) to the number of "n". The array antenna 16 has a multiplicity of patches $P1_{-1}$–$P1_{-n}$, $P2_{-1}$–$P2_{-n}$, $P3_{-1}$–$P3_{-n}$ and $P4_{-1}$–$P4_{-n}$.

Transmission selecting circuit 18 has transmitting circuits $18_{-1}$–$18_{-n}$ while the reception selecting circuit 22 has receiving circuits $22_{-1}$–$22_{-n}$. The transmission and reception selecting circuits 18, 22 have two PIN diodes D1, D2; D3, D4 with interconnected anodes, respectively.

Array antenna 16, transmission selecting circuit 18 and reception selecting circuit 22 are all formed on the same substrate 36. The substrate 36 comprises an earth plate 36B and two dielectric substrates 36A, 36C sandwiching the earth plate 36B. Each feeder 38 connected to the patches $P1_{-1}$–$P1_{-n}$, $P2_{-1}$–$P2_{-n}$, $P3_{-1}$–$P3_{-n}$, $P4_{-1}$–$P4_{-n}$ forms a microstrip line 40 jointly with the dielectric substrate 36A and earth plate 36B.

Patches $P1_{-1}$–$P1_{-n}$, $P2_{-1}$–$P2_{-n}$, $P3_{-1}$–$P3_{-n}$, $P4_{-1}$–$P4_{-n}$, dielectric substrate 36A and earth plate 36B jointly form a planar antenna, that is, a patch antenna (microstrip antenna).

Each planar antenna (element antenna) having the patches $P1_{-1}$–$P1_{-n}$, $P2_{-1}$–$P2_{-n}$ forms a transmitting planar antenna element 12 while each planar antenna (element antenna) having the patches $P3_{-1}$–$P3_{-n}$, $P4_{-1}$–$P4_{-n}$ forms a receiving planar antenna element 14.

With the array antenna 16, the transmission selecting circuit 18 and the reception selecting circuit 22, all provided on the same substrate 36 to be unified therewith, it becomes possible to increase the durability and reliability of those parts and to reduce the size of the antenna device 10. By securing the array antenna 16 and the planar antenna elements 12, 14 to the same substrate 36, it also becomes possible to make the relative positions between the transmitting planar antenna elements 12 and the receiving planar antenna elements 14 invariable against the vibration of the substrate 36, thereby increasing the reliability of the antenna device 10. Therefore, the inventive antenna device is particularly suited for application to a vehicle-mounted radar apparatus which is subjected to vibrations.

Figure 2:
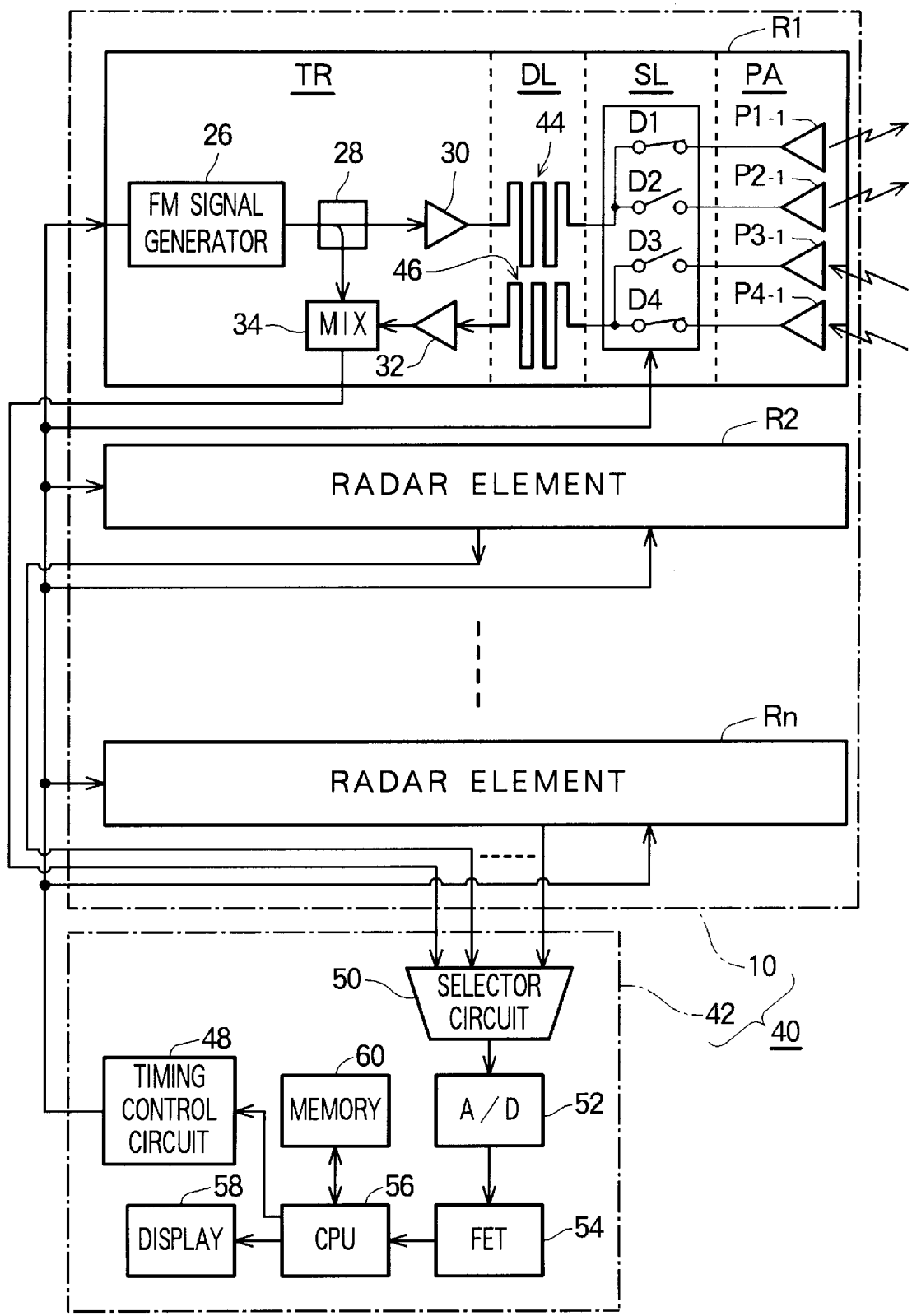
FIG. 2 is a block diagram illustrating the general arrangement of a radar apparatus employing the antenna device according to the present invention.

Reference is now had to FIG. 2 showing in block diagram a vehicle-mounted radar apparatus 40 employing the antenna device 10 according to the present invention. In this figure, the PIN diodes D1–D4 are shown in the form of an equivalent circuit.

Vehicle-mounted radar apparatus 40 has as many as "n" radar elements R1–Rn and a processing section 42 for controlling the action of the radar elements R1–Rn and processing a signal containing information relating to an obstacle or target to provide an alarm. The radar elements R1–Rn are formed by the antenna device 10 shown in FIG. 1.

Radar element R1 is comprised of a transmitter-receiver section TR, a delay section DL having delay circuits 44, 46, a selecting section SL having the PIN diodes D1–D4, and a multibeam planar array antenna section PA having four patches $P1_{-1}$, $P2_{-1}$, $P3_{-1}$ and $P4_{-1}$. The transmitter-receiver section TR has an FM signal generator 26, a coupler 28, high-frequency amplifiers 30, 32, and a mixer 34.

Radar element Rn differs from the R1 in that it includes four patches $P1_{-n}$–$P4_{-n}$ ("n" represents an integral number larger than 2) in place of the four patches $P1_{-1}$–$P4_{-1}$.

High-frequency amplifiers 30, 32, delay circuit 44, 46 and patches $P1_{-1}$–$P4_{-1}$ included in the radar element R1 respectively correspond to the high-frequency amplifiers $30_{-1}$, $32_{-1}$, delay circuits $44_{-1}$, $46_{-1}$ and patches $P1_{-1}$–$P4_{-1}$ of the antenna device 10 shown in FIG. 1. In the selecting section SL, two PIN diodes D1, D2 interconnected at one ends thereof correspond to the two PIN diodes D1, D2 with the interconnected anode, of the selecting circuit $18_{-1}$ shown in FIG. 1, whilst two PIN diodes D3, D4 interconnected at one ends thereof correspond to the two PIN diodes D3, D4 with the interconnected anode, of the selecting circuit 22-$_1$ shown in FIG. 1.

Similarly, although not shown, the radar element Rn has high-frequency amplifiers, delay circuits, and patches corresponding to the high-frequency amplifiers 30-$_n$, 32-$_n$, delay circuits 44-$_n$, 46-$_n$, and patches P1-$_n$–P4-$_n$ of the antenna device 10 shown in FIG. 1. In the selecting section SL, two PIN diodes D1, D2 interconnected at one ends thereof correspond to the two PIN diodes D1, D2 with the interconnected anode, of the selecting circuit 18-$_n$ shown in FIG. 1, whilst two PIN diodes D3, D4 interconnected at one ends thereof correspond to the two PIN diodes D3, D4 with the interconnected anode, of the selecting circuit 22-$_n$ shown in FIG. 1.

FM signal generator 26 of the radar element R1 generates an FM signal with a frequency varying into the shape of a saw tooth in synchronization with a timing control signal fed from a timing control circuit 48 of the processing section 42. In the embodiment being described, frequency of the FM signal is about 60 GHz. Part of the FM signal is supplied to the selecting section SL through the coupler 28, high-frequency amplifier 30 and delay circuit 44.

Through one or both of the PIN diodes D1, D2 which are switched ON or OFF based on the control signal fed from the timing control circuit 48 of the processing section 42, the FM signal is radiated outwardly of a vehicle via one or both of the patches P1-$_1$, P2-$_1$.

The FM signal radiated from the patches is reflected by an external object (obstacle). The reflected FM signal is received by the patches P3-$_1$, P4-$_1$ and supplied to one input terminal of the mixer 34 via the one of the PIN diodes D3, D4 placed in an ON state based on the control signal fed from the timing control circuit 48 of the processing section 42, and through the delay circuit 46 and high-frequency amplifier 32.

Opposite input terminal of the mixer 34 is supplied via the coupler 28 with part of the FM signal generated by the FM signal generator 26. Thus, the mixer 34 outputs a beat signal of frequency increasing in correspondence with a distance to the object which caused the signal reflection. The beat signal is fed to the processing section 42 and then to an A/D convertor circuit 52 via a selector circuit 50, where it is converted into a digital signal. The beat signal converted into a digital form is resolved into a frequency spectrum in a fast Fourier transformer (FFT) circuit 54. A central processing unit (CPU) 56 detects information relating to the obstacle or target by analyzing the beat signal resolved into a frequency spectrum and displays the information on a display 58. Reference numeral 60 designates a memory for storing a control program for controlling the action of the CPU 56 and other data.

By placing one of the PIN diodes D1, D2 in an ON state and selecting one of the patches P1-$_1$, P2-$_1$ (or P1-$_n$, P2-$_n$), it becomes possible for a multibeam planar array antenna section PA to radiate a main beam in a direction corresponding to their respective patches (respective transmitting planar antenna elements).

When both PIN diodes D1, D2 are placed in an ON state and two patches P1-$_1$, P2-$_1$ (or P1-$_n$, P2-$_n$) are selected, beams from the two patches are synthesized, thereby enabling the multibeam planar array antenna section PA to radiate a main beam in a direction different from that of the case wherein one patch is selected. This further enables more minute switching of main beam directions and improves the directional resolution.

By providing the transmitting planar antenna elements 12 and receiving planar antenna elements separately as in the antenna device 10 of FIG. 1, it becomes possible to separate a transmission system and a reception system and thus to significantly lower the level of deterioration of the reception sensitivity due to the leakage of part of a received signal into the transmission system, as compared to the case wherein both transmission and reception are performed by a single planar antenna element and signal separation is effected via a circulator. Separate provision of the transmitting and receiving planar antenna elements also enables making virtual beams narrow angled. While the relation between the direction and intensity of beam radiation of an antenna is generally referred to as directivity, such directivity also refers to the relation between the direction and intensity of beam absorption. When a single planar antenna element is used for both transmission and reception, the direction of a beam (main beam) radiated from the antenna element coincides with the direction of a beam received by the antenna element. By contrast, when the transmitting planar antenna elements 12 and receiving planar antenna elements 14 are provided separately as in the present invention, the directions of beams radiated by the transmitting planar antenna elements 12 (directivities of the transmitting planar antenna elements) are slightly displaced from the directions of beams radiated by the receiving planar antenna elements 14 (directivities of the receiving planar antenna elements), thereby enabling the detection of an object (target) in an overlapped range of those directions. As a result, the widths of the virtual beams can be narrowed, and the directional resolution can also be improved in this respect.

As shown in the antenna device 10 of FIG. 1, by selecting one or more of the receiving planar antenna elements 14 with one of the PIN diodes D3, D4 of the selecting circuit 22 placed in an ON state, the receiving planar antenna elements R are rendered capable of absorbing reflected beams from various directions in correspondence therewith. This enables more minute switching of the beam absorption directions and hence diversity absorption of the beams reflected by the object and detailed detection of the target configuration. For example, the antenna device may be conveniently applied to a vehicle-mounted radar apparatus so that a target external to a vehicle can be detected with more accuracy.

PIN diodes D1–D4 can be put ON or OFF by switching between forward bias and reverse bias and are used as switches. High-speed switching transistors formed of GaAs or the like may be used in place of the PIN diodes D1–D4.

Antenna device 10 may be provided at a front end or a rear end, or at four corners, of a vehicle. The processing section 42 may be provided at any desired interior location of the vehicle.

Receiving circuit 24 of FIG. 1 may be formed of the processing section 42, as many as "n" high-frequency amplifiers 32, and as many as "n" mixers 34. It is not always necessary for the high-frequency amplifiers 32 to be provided.

Each of the patches P1-$_1$–P1-$_n$, P2-$_1$–P2-$_n$, P3-$_1$–P3-$_n$, P4-$_1$–P4-$_n$ may have a rectangular shape with one side of about 1.6–2.0 mm long. Spacing between the patches may be about 0.2–2.0 mm.

Antenna device 10 according to the present invention may also be applied to an interior radio-LAN system.

Figure 3:
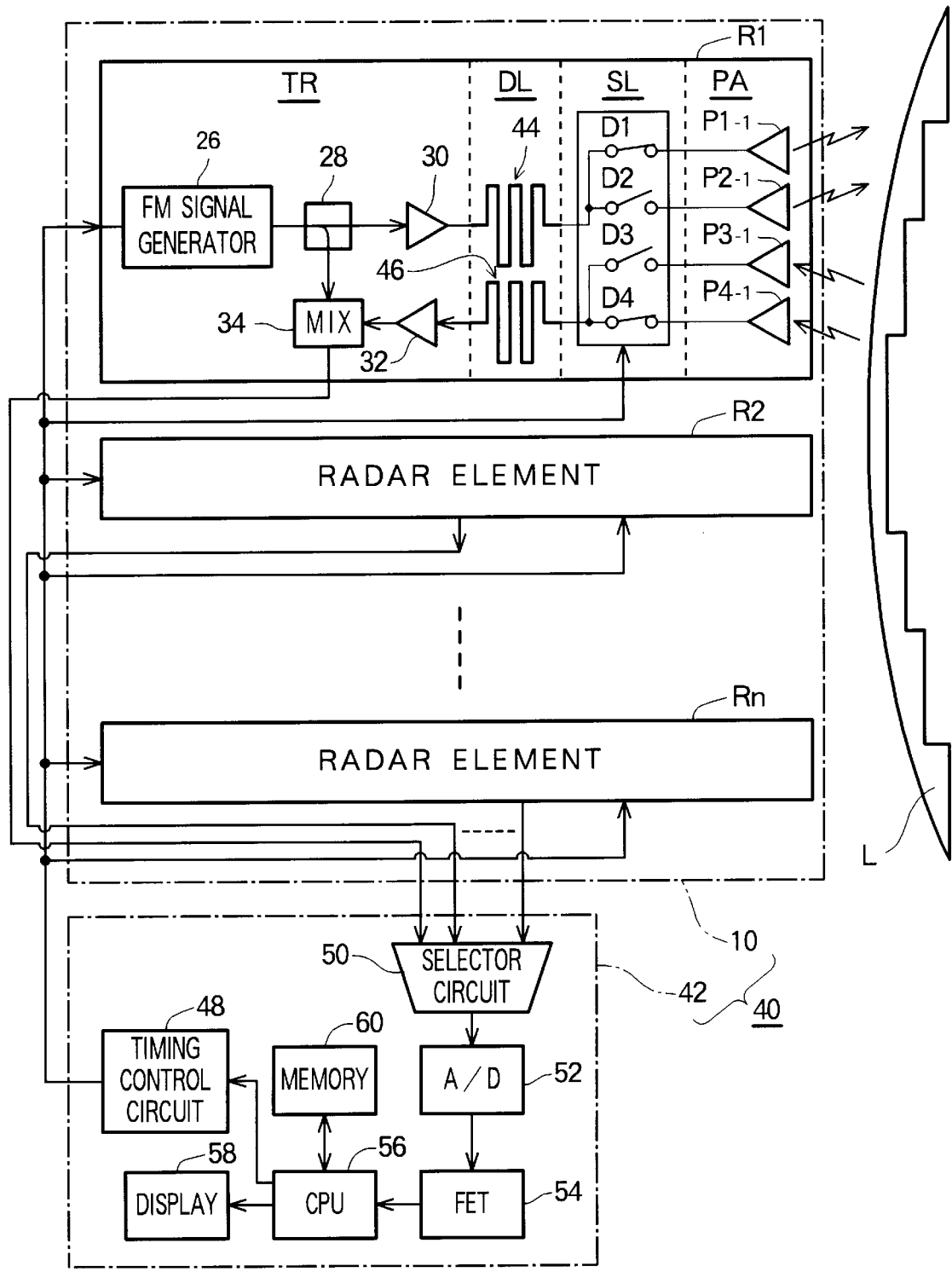
FIG. 3 is a block diagram illustrating the general arrangement of an aperture antenna system formed by the antenna device combined with a lens.
Figure 4:
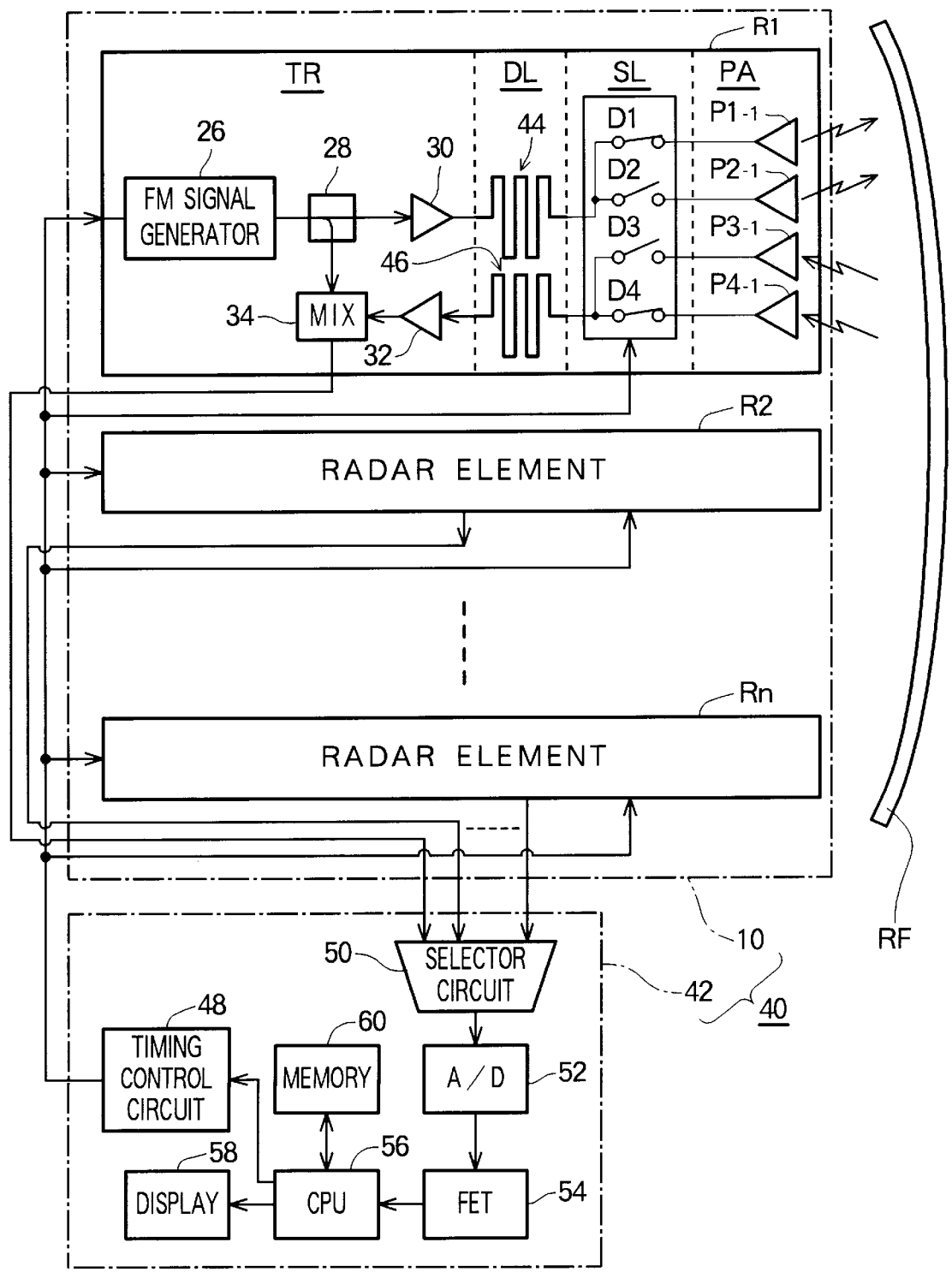
FIG. 4 is a block diagram illustrating the general arrangement of an aperture antenna system formed by the antenna device combined with a reflector.

As can be appreciated from FIGS. 3 and 4, the antenna device 10 may be combined with a lens L (FIG. 3) or a reflector RF (FIG. 4) to thereby provide an aperture antenna such as an offset parabolic antenna. In this instance, the inventive antenna device 10 may be used as a primary radiator while the lens or the reflector may be used as a secondary radiator. Use of the inventive antenna device enables the size reduction of the primary radiator. Employment of the lens or reflector as the secondary radiator enables beam direction switching by defocused feeding, etc. It may also be readily appreciated that the FM signal generator 26, coupler 28, high-frequency amplifiers 30, 32, mixer 34, etc. may be combined to provide a monolithic microwave integrated circuit (MMIC).

Obviously, various minor changes and modifications are possible in the light of the above teaching. It is to be understood that within the scope of the appended claims, the present invention may be practiced otherwise than as specifically described.

What is claimed is:

1. An antenna device comprising:
   an array antenna having a plurality of transmitting planar antenna elements and a plurality of receiving planar antenna elements;
   a transmission selecting circuit for selecting at least one of said transmitting planar antenna elements;
   a transmitting circuit for transmitting a signal to said selected at least one transmitting planar antenna element; and
   a receiving circuit for receiving a signal from each of said receiving planar antenna elements;
   whereby each of said plurality of transmitting planar antenna elements is electrically connected to one of said plurality of receiving planar antenna elements through said transmitting circuit and said receiving circuit.

2. An antenna device according to claim 1, wherein said transmission selecting circuit selects two of said transmitting planar antenna elements, and said transmitting circuit transmits said signal to said selected at least two transmitting planar antenna elements simultaneously.

3. An antenna device comprising:
   an array antenna having a plurality of transmitting planar antenna elements and a plurality of receiving planar antenna elements;
   a transmitting circuit for transmitting a signal to each of said transmitting planar antenna elements;
   a reception selecting circuit for selecting at least one of said receiving planar antenna elements; and
   a receiving circuit for receiving a signal from said selected at least one receiving planar antenna element;
   whereby each of said plurality of transmitting planar antenna elements is electrically connected to one of said plurality of receiving planar antenna elements through said transmitting circuit and said receiving circuit.

4. An antenna device according to claim 3, wherein said reception selecting circuit selects two of said receiving planar antenna elements, and said receiving circuit receives said signals from said selected two receiving antenna elements simultaneously.

5. An antenna device comprising:
   an array antenna having a plurality of transmitting planar antenna elements and a plurality of receiving planar antenna elements;
   a transmission selecting circuit for selecting at least one of said transmitting planar antenna elements;
   a transmitting circuit for transmitting a signal to said selected at least one transmitting planar antenna element;
   a reception selecting circuit for selecting at least one of said receiving planar antenna elements; and
   a receiving circuit for receiving a signal from said selected at least one receiving planar antenna element;
   whereby each of said plurality of transmitting planar antenna elements is electrically connected to one of said plurality of receiving planar antenna elements through said transmitting circuit and said receiving circuit.

6. An antenna device according to claim 5, wherein said transmission selecting circuit selects two of said transmitting planar antenna elements, said transmitting circuit transmits said signal to said selected two transmitting antenna elements simultaneously, said reception selecting circuit selects two of said receiving planar antenna elements, and said receiving circuit receives said signals from said selected two receiving antenna elements simultaneously.

7. An antenna device according to claim 1 or 2, wherein said array antenna and said transmission selecting circuit are formed on the same substrate.

8. An antenna device according to claim 3 or 4, wherein said array antenna and said reception selecting circuit are formed on the same substrate.

9. An antenna device according to claim 5 or 6, wherein said array antenna, said transmission selecting circuit and said reception selecting circuit are formed on the same substrate.

10. An aperture antenna system comprising a primary radiator and a secondary radiator, said primary radiator being an antenna device, said secondary radiator being a lens,
    said antenna device comprising:
    an array antenna having a plurality of transmitting planar antenna elements and a plurality of receiving planar antenna elements;
    a transmission selecting circuit for selecting at least one of said transmitting planar antenna elements;
    a transmitting circuit for transmitting a signal to said selected at least one transmitting planar antenna element; and
    a receiving circuit for receiving a signal from each of said receiving planar antenna elements;
    whereby each of said plurality of transmitting planar antenna elements is electrically connected to one of said plurality of receiving planar antenna elements through said transmitting circuit and said receiving circuit.

11. An aperture antenna system according to claim 10, wherein said transmission selecting circuit selects two of said transmitting planar antenna elements, and said transmitting circuit transmits said signal to said selected two transmitting planar elements simultaneously.

12. An aperture antenna system comprising a primary radiator and a secondary radiator, said primary radiator being an antenna device, said secondary radiator being a lens,
    said antenna device comprising:
    an array antenna having a plurality of transmitting planar antenna elements and a plurality of receiving planar antenna elements;
    a transmitting circuit for transmitting a signal to each of said transmitting planar antenna elements;
    a reception selecting circuit for selecting at least one of said receiving planar antenna elements; and
    a receiving circuit for receiving a signal from said selected at least one receiving planar antenna elements;

whereby each of said plurality of transmitting planar antenna elements is electrically connected to one of said plurality of receiving planar antenna elements through said transmitting circuit and said receiving circuit.

13. An aperture antenna system according to claim 12, wherein said reception selecting circuit selects two of said receiving planar antenna elements, and said receiving circuit receives said signals from said selected two receiving planar antenna elements simultaneously.

14. An aperture antenna system comprising a primary radiator and a secondary radiator, said primary radiator being an antenna device, said secondary radiator being a lens, said antenna device comprising:

an array antenna having a plurality of transmitting planar antenna elements and a plurality of receiving planar antenna elements;

a transmission selecting circuit for selecting at least one of said transmitting planar antenna elements;

a transmitting circuit for transmitting a signal to said selected at least one transmitting planar antenna element;

a reception selecting circuit for selecting at least one of said receiving planar antenna elements; and a receiving circuit for receiving a signal from said selected at least one receiving planar antenna element;

whereby each of said plurality of transmitting planar antenna elements is electrically connected to one of said plurality of receiving planar antenna elements through said transmitting circuit and said receiving circuit.

15. An aperture antenna system according to claim 14, wherein said transmission selecting circuit selects two of said transmitting planar antenna elements, said transmitting circuit transmits said signal to said selected two transmitting planar antenna elements simultaneously, said reception selecting circuit selects two of said receiving planar antenna elements, and said receiving circuit receives said signals from said selected two receiving planar antenna elements simultaneously.

16. An aperture antenna system according to claim 10 or 11, wherein said array antenna and said transmission selecting circuit are formed on the same substrate.

17. An aperture antenna system according to claim 12 or 13, wherein said array antenna and said reception selecting circuit are formed on the same substrate.

18. An aperture antenna system according to claim 14 or 15, wherein said array antenna, said transmission selecting circuit, and said reception selecting circuit are formed on the same substrate.

19. An aperture antenna system comprising a primary radiator and a secondary radiator, said primary radiator being an antenna device, said secondary radiator being a reflector, said antenna device comprising:

an array antenna having a plurality of transmitting planar antenna elements and a plurality of receiving planar antenna elements;

a transmission selecting circuit for selecting at least one of said transmitting planar antenna elements;

a transmitting circuit for transmitting a signal to said selected at least one transmitting planar antenna element; and a receiving circuit for receiving a signal from each of said receiving planar antenna elements;

whereby each of said plurality of transmitting planar antenna elements is electrically connected to one of said plurality of receiving planar antenna elements through said transmitting circuit and said receiving circuit.

20. An aperture antenna system according to claim 19, wherein said transmission selecting circuit selects two of said transmitting planar antenna elements, and said transmitting circuit transmits said signal to said selected two transmitting planar antenna elements simultaneously.

21. An aperture antenna system comprising a primary radiator and a secondary radiator, said primary radiator being an antenna device, said secondary radiator being a reflector, said antenna device comprising:

an array antenna having a plurality of transmitting planar antenna elements and a plurality of receiving planar antenna elements;

a transmitting circuit for transmitting a signal to each of said transmitting planar antenna elements;

a reception selecting circuit for selecting at least one of said receiving planar antenna elements; and a receiving circuit for receiving a signal from said selected at least one receiving planar antenna element;

whereby each of said plurality of transmitting planar antenna elements is electrically connected to one of said plurality of receiving planar antenna elements through said transmitting circuit and said receiving circuit.

22. An aperture antenna system according to claim 21, wherein said reception selecting circuit selects two of said receiving planar antenna elements, and said receiving circuit receives said signals from said selected two receiving planar antenna elements simultaneously.

23. An aperture antenna system comprising a primary radiator and a secondary radiator, said primary radiator being an antenna device, said secondary radiator being a reflector, said antenna device comprising:

an array antenna having a plurality of transmitting planar antenna elements and a plurality of receiving planar antenna elements;

a transmission selecting circuit for selecting at least one of said transmitting planar antenna elements;

a transmitting circuit for transmitting a signal to said selected at least one transmitting planar antenna element;

a reception selecting circuit for selecting at least one of said receiving planar antenna elements; and a receiving circuit for receiving a signal from said selected at least one receiving planar antenna element;

whereby each of said plurality of transmitting planar antenna elements is electrically connected to one of said plurality of receiving planar antenna elements through said transmitting circuit and said receiving circuit.

24. An aperture antenna system according to claim 23, wherein said transmission selecting circuit selects two of said transmitting planar antenna elements, said transmitting circuit transmits said signal to said selected two transmitting planar antenna elements simultaneously, said reception selecting circuit selects two of said receiving planar antenna elements, and said receiving circuit receives said signals from said selected two receiving planar antenna elements simultaneously.

25. An aperture antenna system according to claim 19 or 20, wherein said array antenna and said transmission selecting circuit are formed on the same substrate.

26. An aperture antenna system according to claim 21 or 22, wherein said array antenna and said reception selecting circuit are formed on the same substrate.

27. An aperture antenna system according to claim 23 or 24, wherein said array antenna, said transmission selecting circuit and said reception selecting circuit are formed on the same substrate.

* * * * *